No. 624,907. Patented May 16, 1899.
L. BURRELL.
CENTRIFUGAL LIQUID SEPARATOR.
(Application filed Mar. 7, 1898.)
(No Model.)
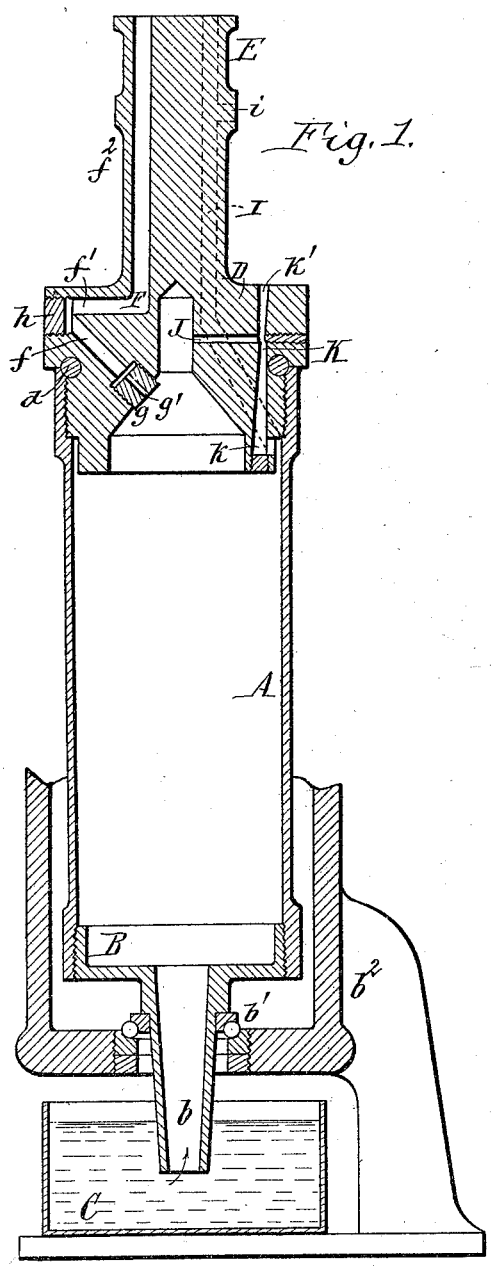
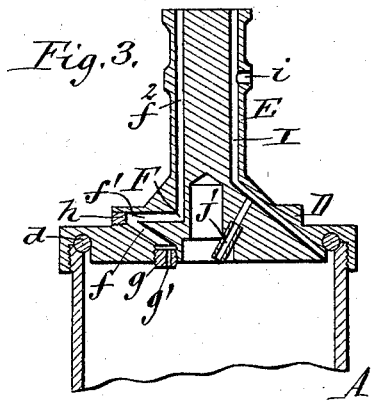
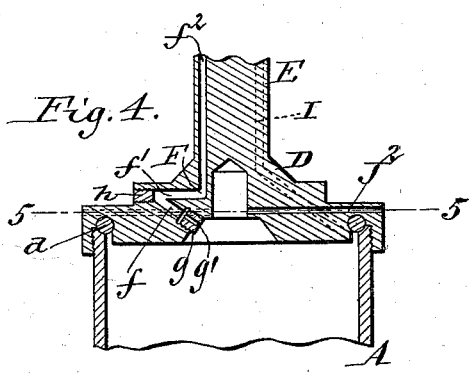
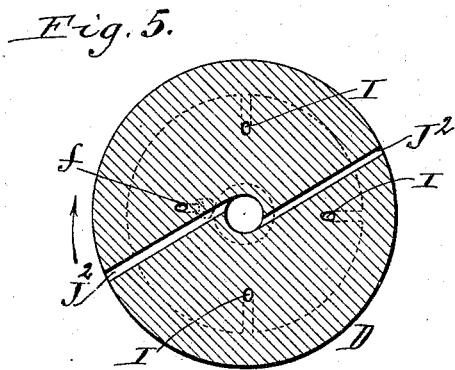
Witnesses:
Henry L. Deck.
Chas. F. Burkhart
Loomis Burrell Inventor.
By Wilhelm & Bonner,
Attorneys.
THE NORRIS PETERS CO., PHOTO-LITHO., WASHINGTON, D. C.

UNITED STATES PATENT OFFICE.

LOOMIS BURRELL, OF LITTLE FALLS, NEW YORK, ASSIGNOR TO D. H. BURRELL & CO., OF SAME PLACE.

CENTRIFUGAL LIQUID-SEPARATOR.

SPECIFICATION forming part of Letters Patent No. 624,907, dated May 16, 1899.

Application filed March 7, 1898. Serial No. 672,819. (No model.)

*To all whom it may concern:*

Be it known that I, LOOMIS BURRELL, a citizen of the United States, residing at Little Falls, in the county of Herkimer, in the State of New York, have invented a new and useful Improvement in Centrifugal Liquid-Separators, of which the following is a specification.

This invention relates to the devices whereby the liquid to be separated—for instance, full milk—is fed to the bowl of a centrifugal liquid-separator and whereby the separated liquids—for instance, cream and skim-milk—are discharged therefrom.

The object of the invention is to cause or accelerate the inflow or feed of the liquid to the bowl by creating a rarefaction of the air in the interior of the bowl.

In the accompanying drawings, Figure 1 is a sectional elevation provided with my improvements. Fig. 2 is an end view of the perforated plug at the receiving end of the cream-passage. Figs. 3 and 4 are sectional elevations of the upper portion of bowls provided with my invention in modified forms. Fig. 5 is a horizontal section in line 5 5, Fig. 4.

Like letters of reference refer to like parts in the several figures.

A represents the cylindrical wall of the bowl of a centrifugal liquid-separator, and B the bottom thereof, provided with a downwardly-extending inlet-neck $b$, which has its open lower end immersed in the milk contained in the supply vessel C, which is arranged below and around this neck. The inner surface of the neck $b$ flares upwardly or is otherwise constructed in such manner that the rotation of the neck drives the milk upwardly through the same and into the bowl. The neck $b$ is supported in a bearing $b'$, which surrounds the neck, and is arranged in a frame $b^2$ of any ordinary or suitable construction.

D represents the cover of the bowl, which is secured to the cylindrical wall in any suitable manner—for instance, as shown, by a screw-thread—and tightened by a packing $d$.

E is the upwardly-projecting neck of the cover, to which power is applied in any suitable manner if the bowl is driven at the top.

F represents the cream-discharge passage, which is composed of three portions—an outwardly-extending portion $f$, an inwardly-extending portion $f'$, and an upwardly-extending portion $f^2$. The outwardly-extending portion $f$ is arranged obliquely and has at its inner or receiving end the adjustable plug or screw $g$, which is provided with an eccentrically-arranged bore $g'$. By turning this screw-plug in its seat the distance of its bore from the axis of the bowl can be increased or reduced, as may be necessary, for regulating the discharge of the cream. The outer end of the portion of the passage $f$ communicates with the outer end of the portion $f'$ thereof, and the inner end of the portion $f'$ communicates with the lower end of the portion $f^2$. The latter extends upwardly through the neck E, and the cream is discharged from the upper end of this portion of the passage. The cream-passage is in this manner formed with a return-bend, which forms a trap and prevents the influx of air from the outside into the interior of the bowl. A screw-plug $h$ is arranged at the outer ends of the portions $f f'$ of the passage for giving access to the same for cleaning.

I represents one of the skim-milk-discharge pipes or passages of ordinary construction, which have their receiving ends arranged near the periphery of the bowl and extend inwardly to the skim-milk level and then upwardly to the outlets $i$ in the side of the neck, as usual. This passage is shown in dotted lines.

J represents an air-exhaust pipe or passage which has its inner end arranged in the air-space within the bowl, which air-space is surrounded by the annular wall of liquid in the bowl, or, in other words, the inner end of this exhaust-pipe is arranged nearer the axis of rotation than the discharge-orifices by which the liquid-level in the bowl is controlled. The outer end of this air-exhaust pipe communicates with an auxiliary skim-milk-discharge passage K in such a way that the skim-milk flows past the outer end of the air-pipe J and draws the air from the same and from the interior air-space of the bowl with which it communicates. This auxiliary skim-milk-discharge pipe is arranged nearer the periphery of the bowl than the outlet portions of the ordinary skim-milk-discharge pipes, so that the skim-milk escapes through this pipe with greater velocity than through the ordinary skim-milk pipes, whereby a correspondingly stronger exhaust effect is produced.

The air-exhaust pipe J extends radially outwardly to the auxiliary skim-milk pipe K. The latter has its inner or receiving end arranged near the peripheral wall of the bowl and extends inwardly a short distance and then upwardly through the base portion of the cover. The lower ascending portion $k$ of the auxiliary skim-milk pipe tapers upwardly to the junction with the air-exhaust pipe J, and the upper portion $k'$ of the skim-milk pipe flares upwardly to the outlet for increasing the exhaust effect. The auxiliary skim-milk pipe is made of such size that it discharges but a portion of the skim-milk, the remainder being discharged through the usual skim-milk pipes.

In the operation of this separator the inlet at the lower end of the bowl is sealed by the liquid in which the inlet-neck is immersed, and both outlets for the separated liquids at the upper end of the bowl are also sealed or trapped, so that the exterior air is prevented from entering the bowl except in so far as air may enter with the liquid through the lower inlet. The outgoing current of skim-milk, which in a centrifugal creamer is the greater volume of the separated liquid, exhausts air continually from the interior of the bowl and causes a rarefaction in the bowl. This rarefaction causes the external air to press upon the liquid in the supply vessel, and this air-pressure causes the liquid to flow upwardly through the receiving-neck and into the bowl. The upwardly-flaring cavity or bore of the inlet-neck drives the liquid upwardly through the neck, and this enables the bowl to be filled in starting. As the bowl gathers speed and the discharge-passages for the cream and skim-milk become filled and sealed by the liquids flowing through the same and the skim-milk begins to discharge, the exhaust action commences, and when this has been established the milk is driven into the bowl from the supply vessel by the air-pressure. The liquid is thereby supplied to the bowl much more rapidly and copiously than by the operation of the flaring inlet. A bowl of large separating capacity can be fully and automatically supplied in this manner and through an inlet of comparatively small diameter, thereby permitting the diameter of the cream-wall and of the bowl to be reduced, which results in a separator of smaller diameter and a saving of power.

In the construction of the separator represented in Fig. 3 the air-exhaust pipe or passage $J'$ is not connected with an auxiliary skim-milk pipe, but with one of the usual skim-milk-discharge pipes I, so that the ordinary current of skim-milk flowing through this pipe produces the exhausting effect. In this figure the screw-plug $g$ at the inlet end of the cream-discharge passage is shown parallel with the axis of the bowl.

In the construction represented in Figs. 4 and 5 the air-exhaust pipes $J^2$ are not connected with a liquid-discharge pipe, but open outwardly into the surrounding air. One or more of these air-exhaust pipes are formed in the cover of the bowl, two being shown, and these pipes may be arranged at an angle to the radial lines, as shown, to increase the force tending to drive the air outwardly through the pipes. The centrifugal force acting upon the columns of air in these exhaust-pipes is mainly operative in exhausting the air from the interior of the bowl and to a small extent the frictional effect of the stationary air which surrounds the rotating bowl. These air-exhaust pipes may be arranged in the bowl or connecting parts, as may be most convenient, their arrangement in the cover being shown as illustrating a simple and compact arrangement of the device. This arrangement of air-exhaust pipes in which the escaping liquid is not operative is more particularly suitable for bowls of considerable diameter.

I claim as my invention—

1. A bowl of a centrifugal separator having an inlet for the liquid to be separated, discharge-passages for the light and heavy separated liquids and an air-exhaust passage having its inlet arranged nearer the axis of the bowl than the inlets of said liquid-discharge passages and extending outwardly from its inlet, substantially as set forth.

2. A bowl of a centrifugal liquid-separator having a trapped inlet for the liquid to be separated, trapped discharge-passages for the light and heavy separated liquids, and an air-exhaust passage having its inlet arranged nearer the axis of the bowl than the inlets of said liquid-discharge passages and extending outwardly from its inlet, substantially as set forth.

3. A bowl of a centrifugal liquid-separator having discharge-passages for the light and heavy separated liquids and an air-exhaust passage which has its inner end arranged nearer the axis of said bowl than the inlets of said liquid-discharge passages and which communicates at its outer end with the discharge-passage for the heavy liquid, whereby the liquid escaping through said discharge-passage exhausts the air from said air-passage and through the latter from the interior of the bowl, substantially as set forth.

4. A bowl of a centrifugal liquid-separator having an inlet for the liquid to be separated, discharge-passages for the light and heavy separated liquids, an auxiliary discharge-passage for the heavy separated liquid having its outlet arranged farther from the axis of the bowl than that of the main discharge-passage for the heavy separated liquid, and an air-exhaust passage having its inlet arranged nearer the axis of the bowl than the inlets of said liquid-discharge passages and extending outwardly from its inlet, substantially as set forth.

5. The combination with the bowl of a centrifugal liquid-separator, having trapped discharge-passages for the light and heavy separated liquids, an air-exhaust passage which has its inlet arranged nearer the axis of the bowl than the inlets of said liquid-discharge passages, and having at its lower end a downwardly-projecting receiving-neck provided with means for raising the liquid to be separated, of a liquid-supply vessel into which said neck projects and whereby the air is excluded therefrom, substantially as set forth.

6. A bowl of a centrifugal liquid-separator having its discharge-passage for the light separated liquid extending outwardly and then inwardly toward the axis of rotation and being thus provided with a trap which retains a body of said liquid and whereby the entrance of air through said passage into the bowl is prevented, substantially as set forth.

7. A bowl of a centrifugal liquid-separator having its discharge-passage for the light separated liquid provided with a portion extending outwardly from the axis of the bowl, a portion which extends inwardly toward the axis of the bowl, and a portion which extends from the inner end of said inwardly-extending portion upwardly to the outlet, whereby a trap is formed in said passage, substantially as set forth.

Witness my hand this 2d day of March, 1898.

LOOMIS BURRELL.

Witnesses:
 HARVEY FELDMEIER,
 G. B. WHITE.